Patented Apr. 12, 1949

2,466,678

UNITED STATES PATENT OFFICE 2,466,678

ACYLATED SUBERATES AND AZELATES

Herman A. Bruson, Rydal, and Harry R. Raterink, Drexel Hill, Pa., assignors, by mesne assignments, to Rohm & Haas Company, Philadelphia, Pa., a corporation of Delaware No Drawing. Application June 26, 1947, Serial No. 757,342

18 Claims. (Cl. 260—483)

This invention concerns acids and esters of the general formula

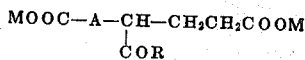

wherein M represents hydrogen or a residue of an alcohol, R represents an alkyl group, particularly an alkyl group of one to three carbon atoms, and A represents an alkylene chain of three to four carbon atoms. With greater particularity, this invention deals with a method for preparing dicarboxylic acids of the aliphatic series in which there occurs between carboxyl groups a divalent saturated aliphatic chain having six to seven carbon atoms and in which an acyl group is attached to a carbon atom in this chain which is in a position gamma to one of the carboxyl groups.

According to this method, the acids and esters of this invention are prepared by subjecting to ring-splitting and hydrolysis in the presence of a hydrolytic agent and water a 2-acyl cyclopentanone or cyclohexanone having also in the 2-position a β-carboxylic ethyl group or a nitrile thereof, —CH₂CH₂X, where X represents a functional carboxylic group, including a nitrile group. Of interest as functional carboxylic groups are the ester groups, —COOR′, where R′ is the residue of a monovalent alcohol, particularly a saturated alkyl group of one to twelve carbon atoms. The nitrile group as X is also of considerable interest. During the ring splitting, it may be left intact or converted to the carboxylic acid or ester form, depending upon reaction conditions. In the latter case, there result, of course, the dicarboxylic acids and esters of this invention.

As starting materials for the present invention, there may be used the 2-cyanoethylated-2-acyl cyclopentanones and cyclohexanones which are more fully described in copending application, Serial No. 757,344, filed on even date, or the 2-carboxyethyl-2-acyl cyclopentanones and cyclohexanones which are more fully described in application Serial No. 757,343, filed on even date.

The 2-acyl-2-(β-cyanoethyl) cycloalkanones are prepared by reacting one mole of a 2-acyl cycloalkanone in the presence of an alkaline condensing agent as catalyst with one mole of acrylonitrile at 10° C. to 85° C. Rather surprisingly, the cycloalkanone is cyanoethylated in the 2-position. As a 2-acyl cycloalkanone, there is used a cyclopentanone or cyclohexanone having both an acyl group and hydrogen in the 2-position. There may be a hydrocarbon substituent, such as a methyl, ethyl, propyl, butyl, hexyl, octyl, cyclohexyl, or methylcyclohexyl group, in a position other than the 2-position of the ring. The acyl group is preferably acetyl, propionyl, butyryl, or isobutyryl, —COR, thus being an acyl group of two to four carbon atoms. Typical 2-acyl cycloalkanones are 2-acetyl cyclopentanone, 2-acetyl cyclohexanone, 2-acetyl-4-methyl cyclohexanone, 2-acetyl-6-methyl cyclohexanone, 2 - acetyl-6-cyclohexyl cyclohexanone, 2-propionyl cyclopentanone or cyclohexanone, 2-butyryl cyclopentanone or cyclohexanone, and the like. As alkaline catalyst for the addition of the 2-acyl cyclopentanone or cyclohexanone and acrylonitrile, there may be used an alkali metal or an amide, hydride, alcoholate, hydroxide, or oxide thereof in small amount, 1% to 10% of the weight of the acyl cycloalkanone being generally sufficient. Similarly, the strongly basic quaternary ammonium hydroxides, such as trimethyl benzyl ammonium hydroxide or dimethyl dibenzyl ammonium hydroxide, may be used. If desired, the addition reaction may be carried out in the presence of an inert organic solvent such as benzene, toluene, dioxane, ether, or tert.-butyl alcohol. After the addition reaction has taken place, the alkaline catalyst is destroyed and the 2-acyl-2-(β-cyanoethyl) cyclopentanone or cyclohexanone separated.

The 2-acyl-2-(β-carboxyethyl) cycloalkanones are prepared in much the same way. The starting materials may be any of the 2-acyl cyclopentanones or cyclohexanones named above. Any of the above-enumerated alkaline condensing agents may be used as a catalyst. In place of acrylonitrile, however, there is used an ester of acrylic acid and a monohydric alcohol, such as methyl, ethyl, propyl, isopropyl, butyl, isobutyl, sec.-butyl, amyl, hexyl, octyl, or dodecyl alcohols. The esters from the saturated aliphatic alcohols of one to four carbon atoms are preferred. In addition to esters from the above alcohols, there may be used esters from benzyl, phenylethyl, hexahydrobenzyl, cyclohexyl, or methylcyclohexyl or similar monohydric alcohols, but usually without advantage, since the alcohol portion is split out in the reaction involved in the instant invention.

Typical preparations of the two major types of starting materials from 2-acyl cycloalkanones follow:

Example A

To a stirred solution of 70 grams of 2-acetyl cyclohexanone, 50 grams of tert.-butyl alcohol, and 2.5 grams of an aqueous 40% solution of benzyl trimethyl ammonium hydroxide there was gradually added acrylonitrile until 26.5 grams had been added. During this addition, the temperature of the reaction mixture rose from 20° C. to 50° C., at which point the reaction vessel was externally cooled. The reaction mixture was allowed to stand for twenty-four hours and was then neutralized with dilute hydrochloric acid. The organic layer was separated, washed with water, dried, and distilled under reduced pressure. The main fraction was redistilled to give 2-acetyl-2-(β-cyanoethyl) cyclohexanone, boiling at 158°–160° C. at 0.10 mm. pressure.

In place of the 2-acetyl cyclohexanone, there may be used 2-propionyl or 2-butyryl cyclohexanone and 2-cyanoethylated derivatives thereof separated.

*Example B*

To a stirred mixture of 77 grams of 2-acetyl cyclopentanone, 61 grams of tert.-butyl alcohol, and five grams of benzyl trimethyl ammonium hydroxide 40% aqueous solution, there was slowly added acrylonitrile in the amount of 32.5 grams. The reaction mixture was maintained within the range of 29° C. and 57° C. by occasional external cooling. The reaction mixture was left standing for twenty-four hours and was then worked up as in Example A. The product, 2-acetyl-2(β-cyanoethyl) cyclopentanone, was obtained as a pale yellow oil boiling at 150°–152° C./1 mm.

In the same way, other 2-acyl cyclopentanones can be converted to 2-acyl-2(β-cyanoethyl) cyclopentanones, including the propionyl and butyryl analogues and 3-, 4-, or 5-substituted 2-acyl cyclopentanones.

*Example C*

A mixture of 70 grams of 2-acetyl cyclohexanone, 50 grams of tert.-butyl alcohol, and 2.5 grams of benzyl trimethyl ammonium hydroxide 40% aqueous solution was prepared in a reaction vessel. Thereto was added methyl acrylate containing a small amount of hydroquinone in an amount of 43 grams. The temperature of the reacting mixture was held at 40° C. by cooling. After the reaction mixture had been left standing for two days, it was made slightly acid with dilute hydrochloric acid. The organic layer was separated, washed, dried, and distilled. The main fraction was redistilled to give 2-acetyl-2-(β-carbomethoxyethyl) cyclohexanone, boiling at 128°–131° C./1 mm.

*Example D*

To a stirred mixture of 77 grams of 2-butyryl cyclopentanone, 34 grams of tert.-butyl alcohol, and five grams of benzyl trimethyl ammonium hydroxide 40% solution, there was added 50 grams of ethyl acrylate. There was then added another five grams of the hydroxide, resulting in a rise in temperature of the reaction mixture to 36° C. The mixture was then left standing overnight and was worked up by the procedures already indicated. The product obtained was 2-butyryl-2-(β-carboethoxyethyl) cyclopentanone, boiling at 145°–148° C./0.6–0.7 mm.

In the same way, other 2-carboalkoxyethyl cyclopentanones or cyclohexanones may be prepared.

By methods such as described above, there may be prepared 2-acetyl-2-(β-cyanoethyl) cyclopentanone, 2-acetyl-2-(β-cyanoethyl) cyclohexanone, 2-propionyl-2-(β-cyanoethyl) cyclopentanone, 2-propionyl-2-(β-cyanoethyl) cyclohexanone, 2 - butyryl - 2 - (β-cyanoethyl cyclopentanone, 2 - butyryl-2-(β-cyanoethyl) cyclohexanone, 2-acetyl-4-methyl-2-(β-cyanoethyl) cyclohexanone, 2-acetyl-6-methyl - 2 - (β-cyanoethyl) cyclohexanone, 2-acetyl-4-tert.-butyl-2-(β-cyanoethyl) cyclohexanone, 2-acetyl-6-cyclohexyl 2-(β-cyanoethyl) cyclohexanone, or 2-acetyl-2-(β-carbomethoxyethyl) cyclopentanone, 2-acetyl - 2 - (β-carbomethoxyethyl) cyclohexanone, 2-propionyl-2-(β-carbomethoxyethyl) cyclopentanone, 2-propionyl - 2-(β-carbomethoxyethyl) cyclohexanone, 2 - butyryl - 2 - (β-carbomethoxyethyl) cyclopentanone, 2-butyryl-2-(β-carbomethoxyethyl) cyclohexanone, 2-acetyl-2-(β-carboethoxyethyl) cyclohexanone, 2-acetyl-2-(β-carbobutoxyethyl) cyclohexanone, 2-acetyl-2-(β-carbodecycloxyethyl) cyclohexanone, 2-acetyl 2 - (β - carbobenzoxyethyl) cyclohexanone, 2 - butyryl-2-(β-carboethoxyethyl) cyclopentanone, 2-propionyl - 2 - (β-carboethoxyethyl) cyclohexanone, etc.

The hydrolytic agents used are those recognized as effective in the hydrolysis or saponification of esters and amides generally. But here these agents perform a dual function of ring splitting and hydrolysis of ester or nitrile groups. Upon ring splitting, the carbonyl group of the ring is converted into a carboxyl group, either in acid form when an acidic hydrolytic agent is used or in salt form when an alkaline agent is used.

Acidic hydrolytic agents include strong acids, such as hydrochloric, hydrobromic, phosphoric, and sulfuric. The concentrations of these agents may vary from 10% to 50%. Optimum concentrations appear to be 30% to 50% for phosphoric acid, 10% to about 37% for hydrochloric acid (the constant boiling acid at about 20% being very convenient and effective), and about 10% to 25% for sulfuric acid.

Alkaline hydrolytic agents include alkali metal hydroxides, particularly sodium and potassium hydroxides, strong basic quaternary ammonium hydroxides, the alkaline earth hydroxides, calcium, strontium, and barium hydroxides, and the strongly basic salts of alkali metals, such as potassium and sodium carbonates. These agents are usually used at concentrations from 5% to 25% in aqueous media. The alkaline agents are consumed in the reaction by the carboxyl group formed from the carbonyl group upon splitting of the ring and then by hydrolysis of the ester or nitrile linkage. For this reason, at least two molecular equivalents are needed to carry the reaction through to the stage where the salt of a dicarboxylic acid is at hand. The action of both acidic and basic hydrolytic agents may be supplemented by the presence of a small amount of a wetting agent or emulsifying agent.

The hydrolytic agents begin to split the ring when mixed with a 2-acyl cyclopentanone or cyclohexanone even at room temperature (25° C.) where, as may be expected, the rate of reaction is slow. It is greatly accelerated as the temperature is increased, and temperatures of about 75° to about 100° C. are particularly useful in carrying out the preparation of the γ-acyl dicarboxylic acids and their derivatives according to this invention. The reaction temperature may be carried above 100° C., generally under pressure, when temperatures such as 110° C. to 120° C. may be employed.

The first stage of the reaction may be represented

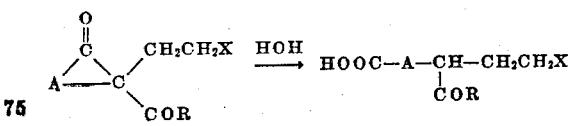

which is thereupon converted to

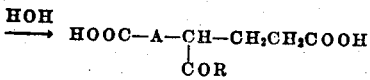

It will be understood that in the presence of an alkaline hydrolytic agent the salt forms are obtained. These may, however, be converted to the carboxylic acid form upon treatment with a strong acid, such as hydrochloric or sulfuric acids.

There is a minor reaction which involves splitting out the acyl group. When this occurs, the ring remains intact, thus:

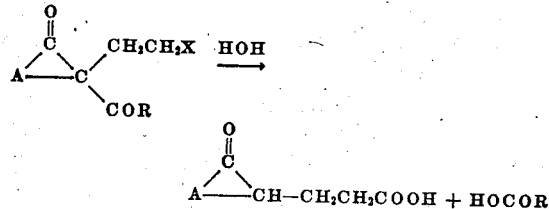

Yet the main product is the desired dicarboxylic acid form, and this may be obtained in yields exceeding 80% of theory.

After the γ-acyl dicarboxylic acids are obtained, they may be separated as such. This is readily done in some cases, particularly where the acyl group or other substituent imparts hydrophobic properties and the acid tends to separate itself from the aqueous phase or may be extracted with a water-immiscible organic solvent. In other cases, and even in the above cases, the acid may readily be converted to esters which are readily separated from the reaction media used in ring-splitting and hydrolysis.

Thus, the acids are useful as intermediates for the formation of esters which, in turn, are useful as plasticizers for many types of resins. For example, these esters plasticize vinyl resins with marked efficiency, being relatively non-volatile therefrom, providing excellent low-temperature flexibility, and being effective at concentrations considerably lower than plasticizers commonly used heretofore. The acids are also useful in the preparation of linear polyesters and alkyd resins, which may be oil-modified.

This invention is illustrated by the following examples:

Example 1

A mixture was made from 358 grams of 2-(β-cyanoethyl)-2-acetyl cyclopentanone-1, 80 grams of sodium hydroxide, and 720 grams of water. The mixture was stirred and heated under reflux for two hours. At this time, an additional 88 grams of sodium hydroxide was added and the refluxing continued for an additional three hours. The solution was then cooled and acidified with 220 grams of 96% sulfuric acid, 355 grams of n-butanol (4.8 moles) and 200 grams of toluene were added, and the mixture was heated under reflux with a water separator until no further water could be separated. The crude product was cooled, stirred with 300 cc. of an aqueous 10% sodium carbonate solution, and filtered. The filtrate was separated into an organic layer and an aqueous layer. The organic layer was washed with water and dried. It was then distilled under reduced pressure to give 72 grams of product at 125°–187° C./0.9 mm. and 457 grams of product at 187°–212° C./0.65 mm. Redistillation gave 24 grams (5.7% theory) of 2-β-carbobutoxyethyl cyclopentanone-1 (carbon, 67.68%; hydrogen, 9.59%, as compared with theoretical values of 67.89% and 9.50%, respectively), which boiled at 112°–116° C./1 mm., had a refractive index, $n_D^{20}$, of 1.4543, and a density, $d_4^{20}$, of 1.004, and 465 grams (71% of theory) of dibutyl γ-acetyl suberate, boiling at 166°–172° C./1 mm. and having a refractive index, $n_D^{20}$, of 1.4487 and a density, $d_4^{20}$, of 0.994. Analysis of the latter compound showed 65.94% of carbon, 9.79% of hydrogen, and a saponification number of 351, as compared with theoretical values of 65.82%, 9.82%, and 342, respectively.

Example 2

A mixture of 358 grams of 2-(β-cyanoethyl)-2-acetyl cyclopentanone-1, 82 grams of sodium hydroxide and 720 cc. of water was stirred and heated under reflux for two hours. An additional 90 grams of sodium hydroxide was then added and the heating under reflux continued for eighteen hours longer. After it was cooled, the solution was acidified with 220 grams of 96% sulfuric acid, 624 grams of 2-ethylhexyl alcohol and 200 grams of toluene were added, and the solution was filtered. The water layer was separated and discarded, and the alcoholic layer was heated under reflux with a water separator until no further water could be separated. The crude product was then washed with sodium carbonate solution and water, dried, and distilled under reduced pressure. Distillation gave 56 grams of product at 167°–184° C./1–2 mm. and 635 grams of product at 206°–237° C./0.8 mm. as well as 63 grams of residue. Redistillation gave thirty grams of 2-β-carbo-2-ethylhexoxyethyl cyclopentanone-1 (5.6% of theory), which boiled at 153°–156° C./0.45 mm., had a refractive index, $n_D^{20}$, of 1.4594, and a density, $d_4^{20}$, of 0.971, and 501 grams (57% of theory) of di-(2-ethyl-hexyl) γ-acetyl suberate, which boiled at 221.5/225° C./0.7 mm., had a refractive index, $n_D^{20}$, of 1.4584, and a density, $d_4^{20}$, of 0.957. Analysis showed that this compound contained 70.87% of carbon and 10.88% of hydrogen and had a saponification number of 262, as compared with theoretical values of 70.86%, 10.98%, and 255, respectively.

Example 3

A mixture consisting of 193 grams of 2-(β-cyanoethyl)-2-propionyl cyclopentanone-1, 41.5 grams of sodium hydroxide, and 360 grams of water was stirred and heated under reflux for two hours. An additional 48 grams of sodium hydroxide was then added and the heating under reflux continued for eighteen hours longer. After it was cooled, the solution was acidified with sulfuric acid, liberating crude carboxylic acid. The crude acid which was formed was esterified with 312 grams of 2-ethylhexyl alcohol, the reaction being carried out as in Example 2. The crude product was then distilled, giving 66 grams up to 179° C./2.4 mm., 34 grams between 179° C./2.4 mm. and 214° C./0.73 mm., and 282 grams at 214°–223° C./0.7 mm. Redistillation gave seven grams of 2-β-carbo-2-ethylhexoxyethyl cyclopentanone-1, which boiled at 135°–142° C./0.5 mm., had a refractive index, $n_D^{20}$, of 1.4595, and 235 grams (51.8% of theory) of di-(2-ethylhexyl) γ-propionyl suberate, which had a boiling point of 216°–217° C./0.6–0.5 mm. and a refractive index, $n_D^{20}$, of 1.4562.

Example 4

A mixture was made from 207 grams of 2-(β-cyanoethyl)-2-butyryl cyclopentanone-1, 41.5 grams of sodium hydroxide, and 360 grams of water. The mixture was stirred and heated under reflux for two hours, when an additional 48 grams of sodium hydroxide was added and the heating under reflux continued for another eighteen hours. After it had been cooled, the solution was acidified with sulfuric acid, thus liberating crude carboxylic acid. The crude acid was esterified with 312 grams of 2-ethylhexyl alcohol, the reaction being carried out as in Example 2. Distillation of the crude product gave forty-eight grams between 83° C./0.8 mm. and 223° C./1.1 mm. and 310 grams at 223° C./1.1–0.63 mm. The residue amounted to twenty-nine grams. Redistillation gave seven grams of 2-β-carbo-2-ethylhexoxyethyl cyclopentanone-1, which distilled at 137°–145° C./0.7 mm. and had a refractive index, $n_D^{20}$, of 1.4597, and 257 grams (55% of theory) of di-(2-ethylhexyl)-γ-butyryl suberate, which had a boiling point of 214°–216° C./0.45 mm. and a refractive index, $n_D^{20}$, of 1.4571.

As shown by the above examples, the cyclopentanones having a 2-acyl group, particularly a group from a lower aliphatic monocarboxylic acid of two to four carbon atoms, may be monocyanoethylated in the 2-position and then reacted with water in the presence of a hydrolytic agent to yield γ-acyl suberic acids which are readily converted to esters. In place of the acyl cyclopentanones used above, those having ring substituents in the 3-, 4-, or 5-positions may be used to give suberates with corresponding substituents in the alkylene chain thereof.

Example 5

A mixture consisting of 193 grams of 2-(β-cyanoethyl)-2-acetyl cyclohexanone-1, 88 grams of sodium hydroxide, and 800 grams of water was stirred and heated under reflux for thirteen hours. After the solution was cooled, it was acidified with sulfuric acid, 178 grams of n-butanol (2.4 moles) and 100 grams of benzene were added, and the esterification carried out as in Example 1. The crude ester was washed with 10% sodium carbonate solution and water and was distilled under reduced pressure. Distillation gave 92 grams of product at 130°–196° C./2 mm. and 168 grams at 193°–198° C./2 mm. The residue amounted to six grams. Redistillation gave 55.5 grams (24.6% of theory) of 2-β-carbobutoxyethyl cyclohexanone-1 (carbon, 68.92%; hydrogen, 9.75%; saponification number, 255, as compared with theoretical values of 69.03%, 9.81%, and 248, respectively), which boiled at 129°–133° C./1 mm. and had a refractive index, $n_D^{25}$, of 1.4571, and 178 grams (52% of theory) of dibutyl γ-acetyl azelate, which boiled at 181°–186° C./1 mm. and had a refractive index, $n_D^{25}$, of 1.4480. By analysis, the latter product contained 66.85% of carbon and 9.96% of hydrogen and had a saponification number of 328 as compared with theoretical values of 66.61%, 10.01%, and 328, respectively.

If, after the alkaline solution has been refluxed, it is made acid, then the water may be evaporated under reduced pressure until crystals of salt appear. These are filtered off and the clear liquor taken up with dry ethyl alcohol and heated with distillation of ethyl alcohol and water. Finally, the reaction mixture is heated with additional ethyl alcohol and toluene until a large proportion of the acid has been esterified. The acid catalyst is neutralized. The volatile solvents are taken off and the di-ethyl ester of γ-acetyl azelaic acid obtained by distillation at low pressure and taking the fraction coming over at about 165°–178° C./0.5–2 mm.

Example 6

A mixture was made from 311 grams of 2-(β-cyanoethyl)-2-acetyl cyclohexanone-1, 90 grams of potassium hydroxide, and 576 grams of water. The mixture was heated under reflux for five hours, whereupon an additional 100 grams of potassium hydroxide was added and the refluxing continued for another eighteen hours. After the solution was cooled, it was acidified with 96% sulfuric acid, 499 grams of 2-ethylhexyl alcohol and 210 grams of toluene were added, and the esterification was carried out as in previous examples. The crude product was treated with potassium carbonate solution, washed with water, and distilled under reduced pressure. It gave 162 grams of a pale, yellow liquid distilling at 125°–197° C./1 mm. and 415 grams of product distilling at 197°–230° C./1 mm., leaving 26 grams of residue. Redistillation gave ninety-six grams (21.3% of theory) of 2-β-carbo-2-ethylhexoxyethyl cyclohexanone-1 (carbon, 72.06%; hydrogen, 10.80%; saponification number, 202, as compared with theoretical values of 72.24%, 10.71%, and 199, respectively), which boiled at 150°–159° C./0.2–0.3 mm., had a refractive index, $n_D^{20}$, of 1.4632, and a density, $d_4^{25}$, of 0.974, and 375 grams (51.9% of theory) of di-(2-ethylhexyl)-γ-acetyl azelate, which boiled at 215°–220° C./0.2 mm., had a refractive index, $n_D^{20}$, of 1.4514, and a density, $d_4^{25}$, of 0.947. By analysis, the latter product contained 71.51% of carbon, 10.95% of hydrogen, and had a saponification number of 248, as compared with theoretical values of 71.30%, 11.09%, and 247, respectively.

Example 7

A mixture consisting of 386 grams of 2-(β-cyanoethyl)-2-acetyl cyclohexanone-1, eighty grams of sodium hydroxide, and 720 grams of water was heated under reflux for two hours, after which time another eighty-eight grams of sodium hydroxide was added and refluxing continued for twenty-four hours longer. The reaction mixture was acidified and the crude acid mixture was esterified with 490 grams of methyl isobutyl carbinol in the presence of two hundred grams of toluene, with separation of water as above. The crude ester was washed in the usual manner and distilled under reduced pressure. Distillation gave 155 grams of a pale, yellow liquid which distilled at 135°–202° C./1 mm. and 299 grams of a yellow liquid which distilled at 202°–208° C./1 mm., leaving a residue of thirty-seven grams. Redistillation gave 109.5 grams (21.5% of theory) of 2-β-carbo-1,3-dimethylbutoxyethyl cyclohexanone-1, which had a boiling point of 125°–128° C./0.15 mm. and a refractive index, $n_D^{20}$, of 1.4584, and 284 grams of di-(1,3-dimethylbutyl) γ-acetyl azelate, which boiled at 187°–192° C./0.25 mm. and had a refractive index, $n_D^{20}$, of 1.4537.

Example 8

A mixture made from 207 grams of 2-(β-cyanoethyl)-2-propionyl cyclohexanone-1, forty grams of sodium hydroxide, and 360 grams of water was stirred and refluxed for two hours. To this mixture there was added another fifty grams of sodium hydroxide, and the refluxing was continued for another twenty hours. The reaction mixture was then made acid, and the crude acid mixture was esterified with 178 grams of n-butanol by the same method as that used above. The product was washed with 10% sodium carbonate solution. Distillation of the washed ester gave forty-eight grams of a colorless liquid which came over at 122°–170° C./0.5 mm. and seventy-eight grams of a pale, yellow liquid which came over at 170°–195° C./0.45 mm., leaving a residue of five grams. Redistillation gave twenty-seven grams of 2-β-carbobutoxyethyl cyclohexanone-1 (carbon, 68.88%; hydrogen, 9.66%; saponification number, 260, compared with theoretical values of 68.97%, 9.81%, and 248, respectively), which boiled at 122°–129° C./0.2 mm. and had a refractive index, $n_D^{20}$, of 1.4596 and a density, $d_4^{25}$, of 1.004, and sixty-three grams of dibutyl γ-propionyl azelate, which boiled at 178°–183° C. and had a refractive index, $n_D^{20}$, of 1.4544 and a density, $d_4^{25}$, of 0.984. The latter product contained, by analysis, 67.72% of carbon and 10.08% of hydrogen and had a saponification number of 330 as compared with theoretical values of 67.36%, 10.18%, and 315, respectively.

Example 9

A mixture was made from 190 grams of 2-(β-cyanoethyl)-2-butyryl cyclohexanone-1, thirty-six grams of sodium hydroxide, and 324 grams of water. This mixture was stirred and refluxed for three and one-half hours, whereupon another forty-five grams of sodium hydroxide was added and the refluxing continued for nineteen hours longer. The reaction mixture was made acid, and the crude acid mixture was esterified with 160 grams of n-butanol by the method used above. The crude ester mixture was washed and distilled under reduced pressure. Distillation gave 28.5 grams of product which came over at 130°–179° C./1 mm. and 139 grams of product which came over at 179°–202° C./1 mm. Redistillation gave twenty-one grams (10.3 % of theory) of 2-β-carbobutoxyethyl cyclohexanone-1, having a refractive index, $n_D^{25}$, of 1.4591, and 130 grams of dibutyl γ-butyryl azelate, which boiled at 190°–196° C./1 mm. and had a refractive index, $n_D^{25}$, of 1.4548.

Example 10

A mixture made from 386 grams of 2-(β-cyanoethyl)-2-acetyl cyclohexanone-1, eighty grams of sodium hydroxide, and 720 cc. of water was stirred and heated under reflux for two hours, after which time another ninety-six grams of sodium hydroxide was added and the mixture refluxed for sixteen hours longer. The reaction mixture was rendered acid with sulfuric acid, and the acid mixture was esterified with 653 grams of isononyl alcohol by the same methods as those used above. The isononyl alcohol employed was a mixture of isomers obtained by reacting diisobutylene with hydrogen and carbon monoxide in the presence of cobalt-kieselguhr catalyst. The crude ester was washed and was distilled under reduced pressure, giving 202 grams of a colorless liquid which distilled at 122°–200° C./1 mm. and 380 grams of a pale yellow liquid which distilled at 200°–231° C./1 mm., leaving a residue of thirty-three grams. Redistillation gave 142 grams (24% of theory) of 2-β-carboisononoxyethyl cyclohexanone-1, distilling at 140°–153° C./1 mm. and having a saponification number of 188 (theory, 190), a refractive index, $n_D^{25}$, of 1.4588, and a density, $d_4^{25}$, of 0.949, and 361 grams (37.4% of theory) of di-(isononyl) γ-acetyl azelate, which boiled at 226°–233° C./1 mm., had a refractive index, $n_D^{25}$, of 1.4552, and a density, $d_4^{25}$, of 0.932. By analysis, the latter product contained 72.02% of carbon and 11.35% of hydrogen and had saponification number of 239 as compared with theoretical values of 72.13% carbon, 11.28% hydrogen, and saponification number of 233.

By essentially the same procedure, there may be made other esters of aliphatic alcohols and γ-acyl azelaic or suberic acids. In each case, the appropriate 2-(β-cyanoethyl)-2-acyl cycloalkanone is reacted with water and a hydrolytic agent to open the ring and hydrolyze the carbonyl and nitrile groups. The acid thus formed is esterified with the desired alcohol to yield the desired ester. Thus, in place of methyl, ethyl, propyl, butyl, hexyl, octyl, or nonyl alcohols, there may be used decyl, or dodecyl, or higher alcohol, such as cetyl or stearyl. In place of these unsubstituted saturated aliphatic monohydric alcohols, there may be used other monohydric acyclic or monohydric cyclic alcohols. Alicyclic alhols, heterocyclic alcohols, and aralkyl alcohols all yield interesting esters. The ether acohols also give an interesting subclass of esters. Typical etheralcohols which impart marked compatibility for the resulting esters with various resins are ethoxyethanol, butoxyethanol, octoxyethanol, methoxypropanol, butoxyethoxyethanol, phenoxyethanol, methylphenoxyethoxyethanol, butylphenoxypropoxypropanol, benzoxyethanol, and the like.

Some typical preparations of these various kinds of esters follow:

Example 11

A mixture consisting of 386 grams of 2-(β-cyanoethyl)-2-acetyl cyclohexanone-1, eighty grams of sodium hydroxide, and 720 grams of water was stirred and heated under reflux for two hours. To this mixture there was then added another ninety-six grams of sodium hydroxide, and heating under reflux was continued for nineteen hours. The solution was then cooled and acidified with sulfuric acid, and the crude acid mixture was esterified with 490 grams of tetrahydrofurfuryl alcohol. The crude ester was washed in the usual manner and distilled under reduced pressure. Distillation gave 170 grams of a pale yellow liquid which came over at 148°–200° C./1 mm. and 377 grams of a yellow oil which came over at 200°–240° C./1 mm., leaving sixty-four grams of residue. Redistillation gave 125 grams (24.6% of theory) of 2-β-carbotetrahydrofurfuroxyethyl cyclohexanone-1 (carbon, 66.18%; hydrogen, 8.75%, compared with theoretical values of 66.09% carbon and 8.73% of hydrogen), which boiled at 159°–165° C./1 mm. and had a refractive index, $n_D^{25}$, of 1.4769 and a density, $d_4^{25}$, of 1.094, and 328 grams of di-(tetrahydrofurfuryl) γ-acetyl azelate, which boiled at 228°–233° C./1 mm. and had a refractive index, $n_D^{25}$, of 1.4753 and a density, $d_4^{25}$, of 1.113. The latter product contained by analysis 63.45% of carbon and 8.72% of hydrogen as compared with theoretical values of 63.30% carbon and 8.60% hydrogen.

Example 12

A mixture was made from 337 grams of 2-(β-cyanoethyl)-2-acetyl cyclohexanone-1, seventy grams of sodium hydroxide, and 630 grams of water. This mixture was refluxed for four hours, when an additional eighty-four grams of sodium hydroxide was added and the heating under reflux continued for another sixteen hours. The mixture was then made acid with sulfuric acid, and the crude acid mixture was heated with 454 grams of benzyl alcohol and two hundred grams of toluene, the solution was filtered, and the water layer separated and discarded. The alcoholic layer was esterified as in the previous examples, washed and distilled, and gave 131 grams of yellow liquid at 155°–208° C./1 mm. and 198 grams of orange liquid at 208°–257° C./1 mm., leaving fifty-eight grams of residue. Redistillation gave 89 grams (17.1% of theory) of 2-β-carbobenzyloxyethyl cyclohexanone-1 (carbon, 73.97%, and hydrogen, 7.64%, as compared with theoretical values of 73.80% and 7.75%, respectively), which boiled at 156°–164° C./1 mm. and had a refractive index, $n_D^{25}$, of 1.5159 and a density, $d_4^{25}$, of 1.091 and, after repeated distillation (with some decomposition), ninety-five grams of dibenzyl γ-acetyl azelate, which boiled at 233°–250° C./1–2 mm. and had a refractive index, $n_D^{25}$, of 1.5248 and a density, $d_4^{25}$, of 1.107. Analysis of the latter product showed that it contained 72.90% of carbon and 7.28% of hydrogen as compared with theoretical values of 73.13% of carbon and 7.37% of hydrogen.

Example 13

A mixture was prepared from 386 grams of 2-(β-cyanoethyl)-2-acetyl cyclohexanone-1, eighty grams of sodium hydroxide, and 720 grams of water. After this mixture was refluxed for two hours, another ninety-six grams of sodium hydroxide was added and the heating was continued for nineteen hours longer. The mixture was then made acid with sulfuric acid, the crude acid mixture was heated with 480 grams of cyclohexanol and two hundred grams of toluene, the solution was filtered, and the water layer was separated and discarded. Esterification and washing of the crude ester mixture as in previous examples gave, on distillation, 105 grams of a pale yellow liquid which came over at 155°–200° C./1 mm. and 285 grams of a yellow liquid which came over at 200°–234° C./1 mm., leaving a residue of thirty grams. Redistillation gave 69.5 grams (13.8% of theory) of 2-β-carbocyclohexoxyethyl cyclohexanone-1, which boiled at 138°–146° C./1 mm. and had a refractive index, $n_D^{25}$, of 1.4778, and 295 grams (37.4% of theory) of dicyclohexyl γ-acetyl azelate, boiling at 213°–220° C./1 mm. and having a refractive index, $n_D^{25}$, of 1.4762.

Example 14

A mixture made from 386 grams of 2-(β-cyanoethyl)-2-acetyl cyclohexanone-1, eighty grams of sodium hydroxide, and 720 grams of water was heated under reflux for two hours, after which time another eighty-eight grams of sodium hydroxide was added and heating under reflux continued for eighteen hours. The solution was acidified with sulfuric acid, and the crude acid mixture was esterified with 566 grams of n-butoxyethanol. The ester mixture was washed in the usual manner and was then distilled, giving 187 grams of a pale yellow liquid at 85°–190° C./1 mm. and 449 grams of yellow liquid at 190°–236° C./1 mm. Redistillation gave 126 grams (23.3% of theory) of 2-β-carbo-n-butoxyethoxyethyl cyclohexanone-1 (carbon, 66.37%; hydrogen, 9.76%; saponification number, 210, as compared with theoretical values of 66.61%, 9.70%, and 208, respectively), which boiled at 153°–157° C./0.45 mm. and had a refractive index, $n_D^{20}$, of 1.4625 and a density, $d_4^{25}$, of 1.010, while distillation of the higher-boiling material led to some decomposition. A fraction (266 grams), however, of di-(n-butoxyethyl) γ-acetyl azelate was obtained, boiling at 221°–228° C./0.2 mm. and having a refractive index, $n_D^{20}$, of 1.4575 and a density, $d_4^{25}$, of 1.014. This latter product contained by analysis 64.53% of carbon and 9.68% of hydrogen as compared with theoretical values of 64.14% of carbon and 9.84% of hydrogen.

Example 15

A mixture made from 193 grams of 2-(β-cyanoethyl)-2-acetyl cyclohexanone-1 and 250 grams of concentrated hydrochloric acid was stirred and heated under reflux for four hours. The reaction mixture was cooled, whereupon the ammonium chloride which had formed during the reaction was removed by filtration. This salt was washed with acetone, and the acetone washings were added to the filtrate. This caused a further separation of ammonium chloride, which was again removed by filtration. The filtrate was then dried by heating on a steam bath under reduced pressure. This gave 224 grams of an oil which still contained a small amount of ammonium chloride. This crude acid mixture was treated with 178 grams of n-butanol and one hundred grams of toluene, one cc. of 96% sulfuric acid was added, and the mixture heated under reflux with a water separator until the esterification was complete. The crude ester was washed with 10% sodium carbonate solution and with water and was distilled under reduced pressure. Distillation gave 103 grams of a pale yellow liquid at 129°–175° C./0.2 mm. and over 150 grams of product at 175°–202° C./0.2 mm. Redistillation gave eighty-two grams (36.3% of theory) of 2-β-carbobutoxyethyl cyclohexanone-1, boiling at 119°–125° C./0.1 mm. and having a refractive index, $n_D^{20}$, of 1.4610, and 153 grams (44.7% of theory) of dibutyl γ-acetyl azelate, boiling at 171°–175° C./0.15 mm. and having a refractive index, $n_D^{20}$, of 1.4503.

In place of the hydrochloric acid, an equivalent amount of 10% sulfuric acid can be used with about the same result.

Variations in the above procedures are shown in the next group of examples.

Example 16

(a) A mixture was prepared from 108 grams of 2-(β-cyanoethyl)-2-acetyl cyclopentanone-1, sixty grams of sodium hydroxide, and 240 grams of water. This mixture was stirred and heated under reflux for a total of fifteen hours. The solution was cooled and was then made acid with 96% sulfuric acid, after which treatment 190 grams of 2-ethylhexyl alcohol and one hundred grams of toluene were added and the resulting mixture stirred and heated under reflux with a water separator until no further water was formed. The crude ester was then washed with 10% sodium carbonate solution, washed twice with water, and distilled. Distillation gave two fractions, one amounting to twenty-eight grams, distilling up to 188° C./3 mm., and one of 150 grams, distilling at 188° C./3 mm. to 230° C./1.5 mm., leaving thirty grams of residue. Redistillation of the second fraction gave 104 grams of di-(2-ethylhexyl) γ-acetyl suberate (39.4% of theory) at 204°–208° C./0.4 mm., having a refractive index, $n_D^{20}$, of 1.4568.

(b) A mixture made from 108 grams of 2-(β-cyanoethyl)-2-acetyl cyclopentanone-1, seventy-two grams of hydrochloric acid (35%–37%), and thirty-six grams of water was stirred and refluxed for seven hours. The ammonium chloride which formed during a reaction was removed by filtration, and the filtrate was dried by heating on a steam bath under reduced pressure. The residue was then esterified by heating it under reflux with 190 grams of 2-ethylhexyl alcohol, one hundred grams of toluene, and one gram of concentrated sulfuric acid. A water separator was used to remove the water formed during this reaction. The crude ester was washed with 10% sodium carbonate solution and with water and was distilled. Distillation gave two fractions, one amounting to forty-eight grams, distilling up to 185° C./0.65 mm., and one amounting to 193 grams, distilling at 185°–211° C./0.65 mm., leaving thirty-seven grams of residue. Redistillation of the second fraction gave 147 grams (55.6% of theory) of di-(2-ethylhexyl) γ-acetyl suberate at 204°–209° C./0.35 mm., having a refractive index, $n_D^{20}$, of 1.4590.

*Example 17*

A mixture was prepared from 140 grams of 2-(β-carboethoxyethyl)-2-acetyl cyclopentanone-1, twenty-six grams of sodium hydroxide, and 260 grams of water. This mixture was stirred and refluxed for three hours, after which time another thirty-five grams of sodium hydroxide was added and the resulting mixture refluxed for three hours longer. The alkaline solution was then made acid with 96% sulfuric acid, and the oil layer which formed was separated. The aqueous layer was extracted with 190 grams of 2-ethylhexyl alcohol and then with one hundred grams of toluene. The extracts were added to the main oil layer and the mixture heated under reflux with a water separator until esterification was complete. The resulting crude ester was washed with 10% sodium carbonate solution and with water and was distilled. Distillation gave two fractions, one amounting to sixty-two grams, distilling up to 205° C./1.5 mm., and another amounting to 213 grams, distilling at 205° C./1.5 mm. to 229° C./0.9 mm., leaving ten grams of residue. Redistillation of the second fraction gave 180 grams (68.2% of theory) of di-(2-ethylhexyl) γ-acetyl suberate at 206°–210° C./0.4 mm., which had a refractive index, $n_D^{20}$, of 1.4567.

In this example, a typical ester of 2-(β-carboxyethyl)-2-acetyl cyclopentanone has been shown as a starting material to give a γ-acetyl suberate. If, instead of carboethoxyethyl-2-acetyl cyclopentanone, there is used the carbomethoxyethyl, carbobutoxyethyl, carbohexoxyethyl, carbooctoxyethyl, carbododecoxyethyl, or other carbalkoxyethyl derivative, the same results are achieved. The ring is split, the ester group is hydrolyzed or saponified, and the γ-acetyl suberic acid is formed. This acid may be separated as such, or it may be converted to one of its esters. This acid and its esters have the same properties when made from the β-carboalkoxyethyl-2-acetyl cyclopentanones as from cyanoethyl-2-acetyl cyclopentanone, and it is, therefore, not necessary to devote more space to preparation and description of acids and esters amply described in previous examples. If, in place of the above 2-(β-carboethoxyethyl)-2-acetyl cyclopentanone, there is used the 2-propionyl or 2-butyryl analogues, the corresponding γ-acyl suberates are obtained. These correspond in all details to the γ-propionyl and γ-butyryl suberic acids and their esters described in various examples above.

*Example 18*

To a solution made from 193 grams of 2-(β-cyanoethyl)-2-acetyl cyclohexanone-1 and 352 grams of water there was added eighty-eight grams of sodium hydroxide, and the resulting solution was stirred and refluxed for five and one-half hours. This mixture was then made acid with 115 grams of 96% sulfuric acid, 286 grams of 2-ethylhexyl alcohol and one hundred grams of toluene were added, and the reaction mixture stirred and heated under reflux with a water separator until no further water was formed. The solution was then cooled, stirred with one hundred cc. of 10% sodium carbonate solution, and filtered. The ester layer was separated, washed with water, and distilled. Distillation gave two fractions, one amounting to fifty-five grams, distilling at 162°–207° C./2 mm., and the other amounting to three hundred grams, distilling at 207°–238° C./2 mm., leaving thirteen grams of residue. Redistillation gave thirty-five grams (12.4% of theory) of 2-β-carbo-2-ethylhexoxyethyl cyclohexanone-1 at 159°–171° C./2 mm., having a refractive index, $n_D^{20}$, of 1.4620, and 284 grams of (62.5% of theory) of di-(2-ethylhexyl) γ-acetyl azelate at 232°–237° C./2 mm., having a refractive index, $n_D^{20}$, of 1.4560.

*Example 19*

A solution made from eighty-eight grams of sodium hydroxide and 176 grams of water was placed in a flask and stirred and heated to 100° C. To this alkaline solution there was added dropwise 193 grams of 2-(β-cyanoethyl)-2-acetyl cyclohexanone-1 during the course of fifty minutes at a temperature of 100°–120° C. Heating was continued under reflux for an additional four and one-half hours. The solution was then cooled and made acid with 115 grams of 96% sulfuric acid, 286 grams of 2-ethylhexyl alcohol and one hundred grams of toluene were added, and the resulting mixture was heated under reflux with a water separator until no further water was formed. The solution was stirred with 100 cc. of 10% sodium carbonate solution, filtered, the ester layer separated and washed with water, and distilled. Distillation gave two fractions, one of fifty-one grams, distilling at 150°–210° C./2 mm., and another amounting to 152 grams, distilling at 210°–237° C./2 mm., leaving a residue amounting to fifteen grams. Redistillation gave 28.5 grams (11.5% of theory) of 2-β-carbo-2-ethylhexoxyethyl cyclohexanone-1 at 151°–171° C./2 mm., having a refractive index, $n_D^{20}$, of 1.4628, and 112 grams (24.7% of theory) of di-(2-ethylhexyl) γ-acetyl azelate at 227°–231° C./2 mm., having a refractive index, $n_D^{20}$, of 1.4574.

*Example 20*

A mixture made from 193 grams of 2-(β-cyanoethyl)-2-acetyl cyclohexanone-1, 206 grams of sodium carbonate, and four hundred cc. of water was heated under reflux for twenty-three hours, after which time an additional 103 grams of sodium carbonate and two hundred cc. of water were added and the heating continued for fifty-five hours longer. At the end of this period, ammonia, which had formed during the reaction, was still being given off. The solution was made acid with concentrated sulfuric acid and filtered to remove the salt. The filtrate was treated with 260 grams of 2-ethylhexyl alcohol and one hundred grams of toluene, the alcohol layer was separated, one cc. of sulfuric acid was added, and the mixture heated under reflux with a water separator until esterification was complete. The crude ester was washed with water, with 10% sodium carbonate solution, and again with water. Upon distillation, it gave two fractions, one of seventy-three grams, distilling at 82° to 193° C./2-3 mm., and the other of 170.5 grams, distilling at 193°-227° C./0.24 mm., leaving nine grams of residue. Upon redistillation, 134 grams of di-(2-ethylhexyl) γ-acetyl azelate was obtained at 220°-227° C./0.15 mm., having a refractive index, $n_D^{20}$, of 1.4571.

Example 21

A mixture made from 193 grams of 2-(β-cyanoethyl)-2-acetyl cyclohexanone-1, 350 grams of barium hydroxide, and six hundred grams of water was stirred and heated under reflux for seven hours. The solution was then cooled and made acid with 115 grams of 96% sulfuric acid. The barium sulfate which precipitated was filtered off and the filtrate concentrated by heating it on a steam bath under reduced pressure. The residue was treated with 178 grams of n-butanol, one hundred grams of toluene, and one cc. of 96% sulfuric acid and stirred and heated under reflux with a water separator until the esterification was complete. The crude ester was washed with one hundred cc. of 10% sodium carbonate solution and with water and was distilled. Distillation gave two fractions, one amounting to forty-three grams, which distilled at 138°-170° C./0.85 mm., and the other amounting to 115 grams, which distilled at 170°-212° C./0.85 mm., leaving a residue of eight grams. Redistillation gave twenty-nine grams (12.8% of theory) of 2-β-carbobutoxyethyl cyclohexanone-1 at 123°-135° C./0.35 mm., having a refractive index, $n_D^{20}$, of 1.4642, and 102 grams of dibutyl γ-acetyl azelate at 185°-200° C./0.5 mm., having a refractive index $n_D^{20}$, of 1.4560.

Example 22

A mixture prepared from 226 grams of 2-(β-carbomethoxyethyl)-2-acetyl cyclohexanone-1, eighty-eight grams of sodium hydroxide, and 360 grams of water was stirred and heated under reflux for three hours. The solution was then heated for an additional three and one-half hours while 150 cc. of distillate was removed. The solution was then cooled and made acid with 115 grams of 96% sulfuric acid, 286 grams of 2-ethylhexyl alcohol and one hundred grams of toluene were added, and the resulting mixture stirred and heated under reflux with a water separator until no further water was formed. The solution was then filtered, washed with one hundred cc. of 10% sodium carbonate solution and with one hundred cc. of water, and distilled. Distillation gave two fractions, one amounting to 101 grams, which distilled at 139°-179° C./0.2 mm., and the other amounting to 259 grams, which distilled at 179°-218° C./0.2 mm., leaving a residue of six grams. Redistillation gave eighty-six grams (30.5% of theory) of 2-β-carbo-2-ethylhexoxyethyl cyclohexanone-1 at 147°-168° C./0.2 mm., having a refractive index, $n_D^{20}$, of 1.4619, and 239 grams (52.6% of theory) of di-(2-ethylhexyl) γ-acetyl azelate at 212°-220° C./0.2 mm., having a refractive index, $n_D^{20}$, of 1.4570.

In place of the 2-(β-carbomethoxyethyl)-2-acetyl cyclohexanone, there may be used the corresponding 2-propionyl or 2-butyryl analogues to give the corresponding γ-propionyl axelates or γ-butyryl azelates such as are described, for instance, in Examples 8 and 9. In place of the β-carbomethoxyethyl group, there may be used other β-carboalkoxyethyl groups. In each case, the same reactions ensue, splitting of the ring, hydrolysis or saponification of the carboalkoxyethyl group, and formation of new γ-acyl azelaic acids and their esters.

The reaction of cyclohexanones or cyclopentanones having both an acyl group and a —CH₂CH₂X group in the 2-position of the ring, where X represents a functional carboxylic group, such as ester or nitrile group, with water in the presence of hydrolytic agents, such as strong inorganic acids or strongly basic substances, yields useful and valuable new γ-acylated suberic and azelaic acids and their esters. The γ-acyl suberic acids and the γ-acyl azelaic acids are obtained as syrups or low-melting solids which are decomposed when heated to boiling, even under reduced pressure. They are, therefore, advantageously separated through their esters. These may be formed in great variety from all types of monohydric alcohols. Most of these esters can be distilled in vacuo to give colorless or practically colorless oils or oils which solidify to waxy solids when the alcohols used to prepare the esters are very long chained, as in the case of cetyl or octadecyl alcohols. The new esters are compatible with many types of resins and give exceptionally interesting plasticizing effects.

We claim:

1. A method for preparing γ-acyl suberates and azelates wherein the acyl group contains one to four carbon atoms, which comprises reacting a compound of the formula

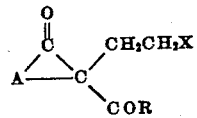

wherein A is an alkylene group having three to four carbon atoms in its alkylene chain, R is an alkyl group of one to three carbon atoms, and X is a functional carboxylic radical from the class consisting of nitrile groups and carboxyl groups esterified with a monohydric alcohol, with water and a hydrolytic agent in amounts sufficient to cleave the ring in said compound and to form two carboxylic groups.

2. A method for forming γ-acyl suberates and azelates wherein the acyl group contains one to four carbon atoms, which comprises reacting a compound of the formula

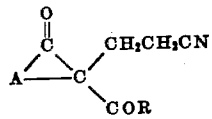

wherein A is an alkylene group having three to four carbon atoms in its alkylene chain and R is an alkyl group of one to three carbon atoms, with water and a hydrolytic agent in amounts sufficient to cleave the ring of said compound and to form two carboxylic groups.

3. A method for forming γ-acyl suberates and azelates wherein the acyl group contains one to four carbon atoms, which comprises reacting a compound of the formula

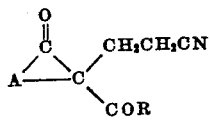

wherein A is an alkylene group having three to four carbon atoms in its alkylene chain and R is an alkyl group of one to three carbon atoms, with water and a strong base in amounts sufficient to cleave the ring of said compound and to form two carboxylic groups.

4. A method for forming γ-acyl suberates and azelates wherein the acyl group contains one to four carbon atoms, which comprises reacting a compound of the formula

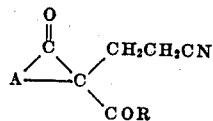

wherein A is an alkylene group having three to four carbon atoms in its alkylene chain and R is an alkyl group of one to three carbon atoms, with water and sodium hydroxide in amounts sufficient to cleave the ring of said compound and to form two carboxylic groups.

5. The method for forming γ-acyl suberates and azelates wherein the acyl group contains one to four carbon atoms, which comprises reacting a compound of the formula

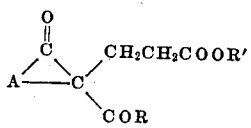

wherein A is an alkylene group having three to four carbon atoms in its alkylene chain, R is an alkyl group of one to three carbon atoms, and R' is the non-hydroxylated residue of a monohydric alcohol, with water and hydrolytic agent in amounts sufficient to cleave the ring of said compound and to form two carboxylic groups.

6. A method for forming γ-acyl suberates and azelates wherein the acyl group contains one to four carbon atoms, which comprises reacting a compound of the formula

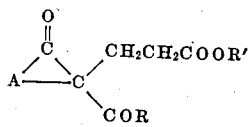

wherein A is an alkylene group having three to four carbon atoms in its alkylene chain, R is an alkyl group of one to three carbon atoms, and R' is the non-hydroxylated residue of a monohydric alcohol, with water and a strong base in amounts sufficient to cleave the ring of said compound and to form two carboxylic groups.

7. A method for forming γ-acyl suberates and azelates wherein the acyl group contains one to four carbon atoms, which comprises reacting a compound of the formula

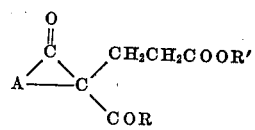

wherein A is an alkylene group having three to four carbon atoms in its alkylene chain, R is an alkyl group of one to three carbon atoms, and R' is the non-hydroxylated residue of a monohydric alcohol, with water and sodium hydroxide in amounts sufficient to cleave the ring of said compound and to form two carboxylic groups.

8. A method for preparing γ-acyl suberates which comprises reacting a compound of the formula

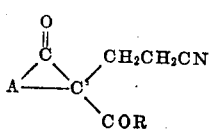

wherein A is an alkylene group of three carbon atoms in its alkylene chain and R is an alkyl group of one to three carbon atoms, with water and a hydrolytic agent in amounts sufficient to cleave the ring of said compound and to form two carboxylic groups.

9. A method for preparing γ-acyl suberates which comprises reacting a compound of the formula

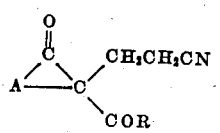

wherein A is an alkylene group of three carbon atoms in its alkylene chain and R is an alkyl group of one to three carbon atoms, with water and sodium hydroxide in amounts sufficient to cleave the ring of said compound and to form two carboxylic groups.

10. A method for preparing γ-acyl azelates which comprises reacting a compound of the formula

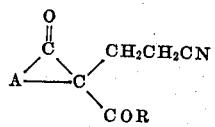

wherein A is an alkylene group of four carbon atoms in its alkylene chain and R is an alkyl group of one to four carbon atoms, with water and a hydrolytic agent in amounts sufficient to cleave the ring of said compound and to form two carboxylic groups.

11. A method for preparing γ-acyl azelates which comprises reacting a compound of the formula

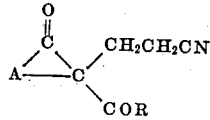

wherein A is an alkylene group of four carbon atoms in its alkylene chain and R is an alkyl group of one to four carbon atoms, with water and sodium hydroxide in amounts sufficient to cleave the ring of said compound and to form two carboxylic groups.

12. A method for preparing γ-acyl suberates which comprises reacting a compound of the formula

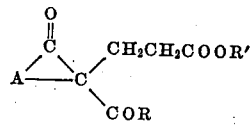

wherein A is a divalent acyclic group having three carbon atoms in its alkylene chain, R is an alkyl group of one to three carbon atoms, and R' is an alkyl group of one to twelve carbon atoms, with water and a strong base in amounts sufficient to cleave the ring of said compound and to form two carboxylic groups.

13. A method for preparing γ-acyl azelates which comprises reacting a compound of the formula

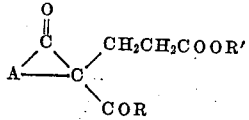

carbon atoms in its alkylene chain, R is an alkyl group of one to three carbon atoms, and R' is an alkyl group of one to twelve carbon atoms, with water and a strong base in amounts sufficient to cleave the ring of said compound and to form two carboxylic groups.

14. A process for preparing esters of monohydric alcohols and γ-acyl suberic and azelaic acids which comprises reacting a compound of the formula

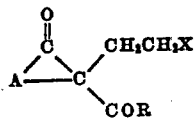

wherein A is an alkylene group having three to four carbon atoms in its alkylene chain, R is an alkyl group of one to three carbon atoms, and X is a functional carboxylic radical from the class consisting of nitrile groups and carboxyl groups esterified with a monohydric alcohol, with water and a strong base in amounts sufficient to cleave the ring in said compound and to form two carboxylic groups, converting said carboxylic groups to the acid form, and esterifying said groups in their acid form with a monohydric alcohol.

15. A process for preparing esters of monohydric alcohols and γ-acyl suberic acid which comprises reacting a compound of the formula

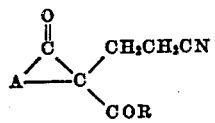

wherein A is an alkylene chain of three carbon atoms and R is an alkyl group of one to three carbon atoms, with water and a strong base in amounts sufficient to cleave the ring in said compound and to form two carboxylate groups, converting these carboxylate groups to carboxylic acid groups, and esterifying them with a monohydric alcohol.

16. The process of claim 15 in which esterifying is performed with a saturated aliphatic alcohol of one to twelve carbon atoms.

17. A process for preparing esters of monohydric alcohols and γ-acyl azelaic acid which comprises reacting a compound of the formula

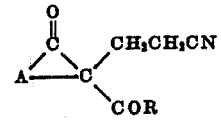

wherein A is an alkylene chain of four carbon atoms and R is an alkyl group of one to three carbon atoms, with water and a strong base in amounts sufficient to cleave the ring in said compound and to form two carboxylate groups, converting these carboxylate groups to carboxylic acid groups, and esterifying them with a monohydric alcohol.

18. The process of claim 17 in which esterifying is performed with a saturated aliphatic alcohol of one to twelve carbon atoms.

HERMAN A. BRUSON.
HARRY R. RATERINK.

REFERENCES CITED

The following references are of record in the file of this patent:

UNITED STATES PATENTS

| Number | Name | Date |
| --- | --- | --- |
| 2,342,606 | Bruson | Feb. 22, 1944 |
| 2,374,327 | Bruson | Apr. 24, 1945 |

FOREIGN PATENTS

| Number | Country | Date |
| --- | --- | --- |
| 164,832 | Switzerland | Jan. 2, 1934 |

OTHER REFERENCES

Perkin et al.: Jour. Chem. Soc. (London), vol. 91, page 1741 (1907).